(12) United States Patent
Schaller

(10) Patent No.: US 7,255,499 B2
(45) Date of Patent: Aug. 14, 2007

(54) CARDANIC SUSPENSION DEVICE FOR A CAMERA BALANCE DEVICE

(75) Inventor: Curt O. Schaller, Munich (DE)

(73) Assignee: Camera Dynamics GmbH, Eching (DE)

( * ) Notice: Subject to any disclaimer, the term of this patent is extended or adjusted under 35 U.S.C. 154(b) by 169 days.

(21) Appl. No.: 10/489,377

(22) PCT Filed: Sep. 9, 2002

(86) PCT No.: PCT/EP02/10093

§ 371 (c)(1),
(2), (4) Date: Sep. 15, 2004

(87) PCT Pub. No.: WO03/023272

PCT Pub. Date: Mar. 20, 2003

(65) Prior Publication Data
US 2005/0036781 A1    Feb. 17, 2005

(30) Foreign Application Priority Data
Sep. 13, 2001   (DE) ............................... 101 45 199

(51) Int. Cl.
*G03B 17/00* (2006.01)
*F16M 11/00* (2006.01)
(52) U.S. Cl. ..................................... 396/421; 248/176.1
(58) Field of Classification Search ................ 396/421; 352/243; 248/176.1, 187.1
See application file for complete search history.

(56) References Cited

U.S. PATENT DOCUMENTS

| 4,158,490 A | 6/1979 | Gottschalk et al. ......... 352/243 |
| 5,579,071 A | 11/1996 | Wetzel et al. ............... 396/428 |
| 5,752,112 A * | 5/1998 | Paddock et al. ............ 396/421 |
| 5,797,054 A | 8/1998 | Haarhoff et al. ............ 396/421 |

FOREIGN PATENT DOCUMENTS

DE    201 12 779    10/2001

\* cited by examiner

*Primary Examiner*—W B Perkey
(74) *Attorney, Agent, or Firm*—Dilworth & Barrese, LLP

(57) ABSTRACT

Disclosed is a cardiac suspension device (3) for a camera balance device (1), comprising two intersecting joint axes ($G_1$, $G_2$); one of said axes extending vertically ($G_2$) (in a perpendicular manner) during operation and the other ($G_1$) extending horizontally, in addition to an axis rotation (D) extending through the vertical joint axis ($G_2$) and lying perpendicular to the horizontal joint axis ($G_1$). A joint output fixing element (27) can be rotated around the vertical joint axis ($G_2$) and is used to fix the cardanic suspension device (3) on the camera balance device (1). A joint input fixing element (25) can rotate around the axis of rotation (D) and is used to fix the cardanic suspension (3) to a support. A centering device (43) is provided in the region of the vertical joint axis ($G_2$) and the horizontal joint axis ($G_1$), enabling the relative position between the joint output fixing element (27) and the camera balance device (1) to be established without slip in said region.

21 Claims, 4 Drawing Sheets

CARDANIC SUSPENSION DEVICE FOR A CAMERA BALANCE DEVICE

BACKGROUND OF THE INVENTION

1. Technical Field

The present invention relates to a cardanic suspension device for a camera balance device.

Camera balance devices of this kind are used to balance video and film cameras which are guided manually by a camera operator and are connected by means of a suspension device, for example, to a spring arm in a waistcoat-type carrying device (so-called body support) which is in turn attached to the body of the camera operator.

The suspension device is intended to prevent tilting and inclined movements, oscillations and stepping movements from the body of the camera operator being transmitted to the camera because it is necessary to guarantee a constant camera alignment at all times and avoid any tilting, inclination or oscillation of the camera. Alternatively, the camera attached to the balance device may also be secured by means of the suspension device to a free-standing support, dolly, crane etc, whereby the suspension device is then able to prevent any unevenness of the ground exerting an influence on the position of the camera.

For this, the suspension device is designed so that the construction comprising camera and balance system is able to execute a pendulum motion relative to the support. In addition, this construction is connected to counterweights. With a suitable choice and positioning of these counterweights, the camera is balanced in such a way that tilting and inclination movements, oscillations and stepping movements are not transmitted from the body support, free-standing support, dolly or crane, etc. to the camera.

2. Prior Art

In a known camera balance device, the camera is attached to one end of a pendulum arm to the other end of which the counterweights are fixed. Batteries are used, for example, as counterweights, which simultaneously function as energy stores.

The pendulum arm is connected to a cardanic suspension device which may in turn be attached, for example, to a spring arm in a body support, to a support, dolly or crane.

In the cardanic suspension of the camera construction, three axes of motion are realized relative to the support: the suspension device comprises two intersecting joint axes (cardanic axes) one of said axes extending vertically (in a perpendicular manner) during operation and the other extending horizontally, in addition to an axis of rotation, extending through the vertical joint axis and lying perpendicular to the horizontal joint axis. A joint output fixing element can be rotated about the vertical joint axis and is used to fix the cardanic suspension device to the pendulum arm of the camera balance device, and a joint input fixing element, which may rotated about the axis of rotation, is used to fix the cardanic suspension device to a support, in particular to the aforementioned body support or also to a free-standing support.

U.S. Pat. No. 5,797,054 discloses a cardanic suspension for a camera balance device. However, here the clamp device for fixing the suspension device to the pendulum arm in the camera balance device is located in the area of the cardanic suspension so that the clamping process can result in the decentralization of the cardanic joint in relation to the three axes.

SUMMARY OF THE INVENTION

The object of the present invention is to provide an improved cardanic suspension for a camera balance device with which the balance setting is maintained over a wide range of camera movements and the decentralization of the cardanic joint is avoided.

This object is achieved by a cardanic suspension device herein. According to this, the output fixing element is fixed to the camera balance device by a clamp device which is arranged in such a way that the clamp device and the centering device are located at a distance from each other, preferably at opposite ends, on the joint output fixing element.

The invention is based on the knowledge that the smallest deviations in the centering of the cardanic suspension device relative to the pendulum arm exert a significant influence on the balance set by means of the counterweights. Deviations in the centering of this kind can, for example, be caused by tolerance deviations in the external diameter of the pendulum arm and result in substantial errors in the camera guidance, in particular if this is performed at high speeds.

Therefore, it is particularly important that in the area of the cardanic joint where the two joint axes and the axis of rotation meet there is no slip between the suspension device and the pendulum arm.

The centering according to the invention guarantees that that a balance set by means of the counterweights is also retained, for example, if the camera construction rotates about 360° relative to the support or the camera operator with the suspension device moves through 360°. If the centering is not performed precisely, even with rotations of less than 180°, balance deviations occur in certain places, which in particular with rapid movements, results in faulty camera guidance.

The fixing of the output fixing element to the camera balance device is preferably achieved by means of a clamp device, which is arranged in such a way that the clamp device and the centering device are located at a distance from each other and preferably at opposite ends of the joint output fixing element. The clamp device for fixing the suspension device to the pendulum arm in the camera balance device is then located as far away as possible from the cardanic suspension so that the clamping process cannot not result in the decentralization of the cardanic joint relative to the three axes.

Advantageous further developments of the cardanic suspension device according to invention may be found herein; and In one advantageous further development of the cardanic suspension device according to the invention, the joint input and/or the joint output fixing element is formed as a handle. The joint input handles may be used to attach the suspension device to a spring arm in the camera operator's waistcoat, to a support or similar. In addition, for manipulation, the joint output handle is also used for placing the suspension device on the pendulum arm in the camera balance device.

The centering device can be adjustable, preferably steplessly adjustable.

In an advantageous further development, the joint output fixing element is formed as a straight tube. In this case, it is able to slide over the correspondingly formed pendulum arm in the camera balance device. Preferably, the suspension device is arranged movably on the camera balance device or on the pendulum arm in order to change its position relative to the camera and counterweights.

The tube can, for example, have a circular section. Also conceivable is a rectangular or square embodiment.

In one advantageous embodiment, the centering device is formed by an adjusting ring provided with a clamping cone, which in turn interacts with a clamping ring. If the joint output fixing element is formed, as described above, as a tube with a circular cross section, the adjusting ring can be screwed into one end of the tube and interact with a clamping ring arranged on the camera balance device.

The clamping ring is preferably made of plastic. It can, however, also be made of metal, ceramic, a composite material or a combination of these materials. Preferably, there is at least one slot in the ring in order to increase deformability and adaptability to the pendulum arm in the camera balance device which extends therein.

The threaded ring is in turn preferably made of metal, but can, however, also be made of plastic, ceramic, a composite material or a combination of these materials.

The suspension device according to the invention can also have a second centering device between the joint input and the joint output fixing elements, with which the vertical joint axis and the axis of rotation are able to move relative to each other. In this case, the centering takes place in a double manner: one centering device may be used to establish the relative position between the joint output fixing element and the camera balance device in the area of the two joint axes without slip. The second centering device may be used to move the vertical joint axis and the axis of rotation relative to each other, preferably along the horizontal joint axis.

In an advantageous embodiment of the invention, the vertical joint axis may be moved along the axial extension of the horizontal joint axis by means of the second centering device. Here, the vertical joint axis may be moved by means of at least one adjusting screw. A particularly preferred embodiment has two adjusting screws whose longitudinal axes extend along the horizontal joint axis. However, it also conceivable to provide only one adjusting screw and one spring-loaded thrust bearing opposite to this so that the adjustment is performed by turning this adjusting screw.

BRIEF DESCRIPTION OF THE DRAWINGS

The following describes the invention in more detail with reference to an example of an embodiment shown in the drawings.

These show.

DETAILED DESCRIPTION OF THE PREFERRED EMBODIMENT

Figure 1:
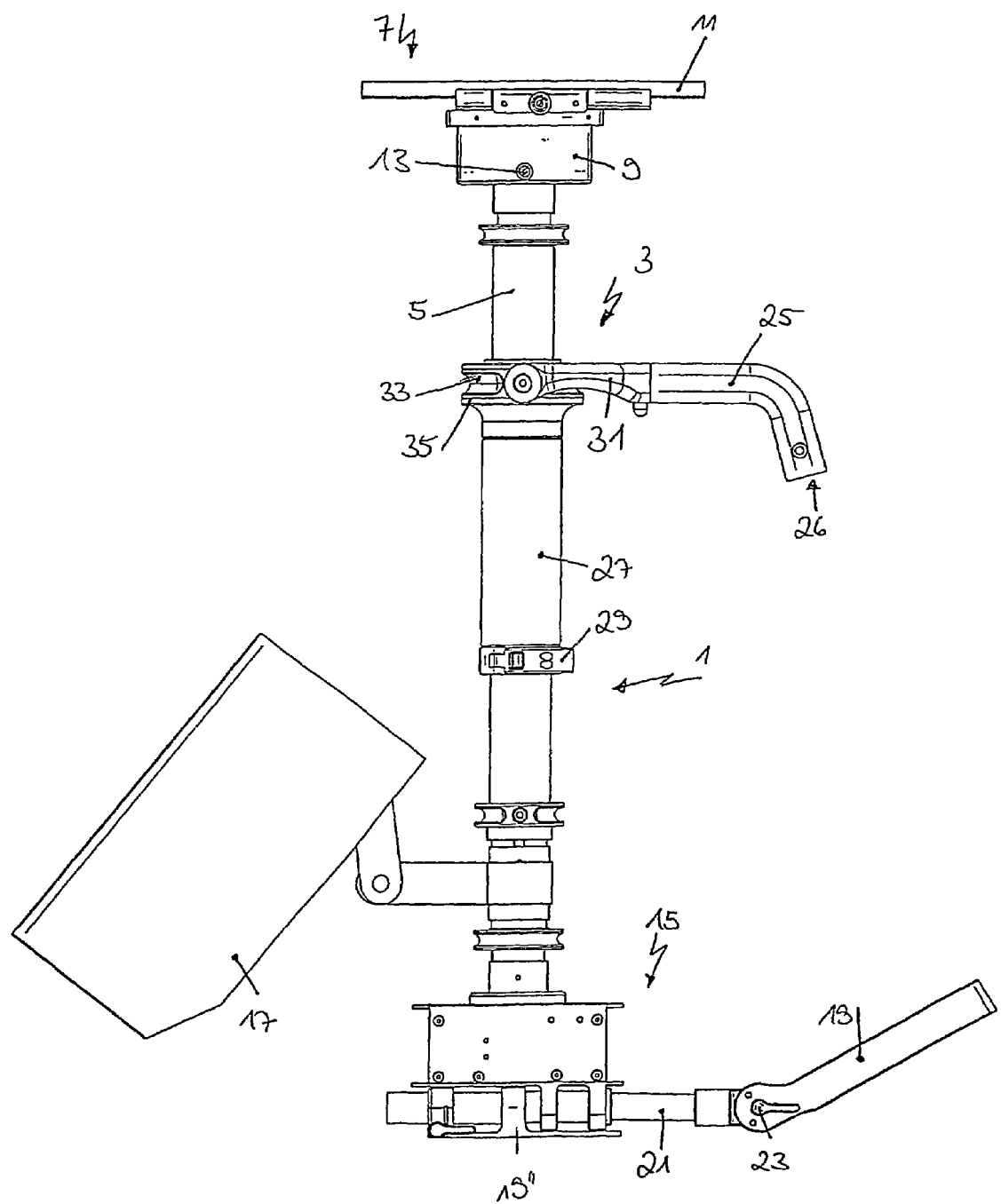
FIG. 1 an overall view of a camera balance system and a cardanic suspension device according to the invention, FIG. 2 a detailed view of the cardanic suspension device according to the invention FIG. 3 a side view of the cardanic suspension device according to the invention, partially in section, and FIG. 4 a top view of the cardanic suspension device according to the invention, partially in section.

FIG. 1 shows a camera balance device 1 together with a cardanic suspension device according to the invention 3.

The camera balance device comprises a pendulum tube 5. At the upper end of the pendulum tube 5 there is a camera fixing device 7, which substantially comprises a base 9 and a holding plate 11 to which a camera may be attached, whereby the holding plate 11 may be moved relative to the base 9 by means of adjusting screws 13 (only one of which is shown here) and to be precise into the plane of projection shown in FIG. 1 or out of this plane. Other adjusting screws (not shown) are provided in order to move the holding plate 11 in FIG. 1 to the right and left relative to the base 9. At the lower end of the pendulum tube 5 there is a holding device 15 for counterweights. Provided in this embodiment are a monitor holder 17 and two backing plates 19, 19" to hold counterweights, which take the form of batteries, for example. The backing plate 19 is attached movably and fixably to sliding tubes 21 (of which only one is visible) and may also be swiveled relative to the sliding tube 21; the backing plate 19 is locked in the desired angular position by means of a clamping lever 23.

Figure 2:
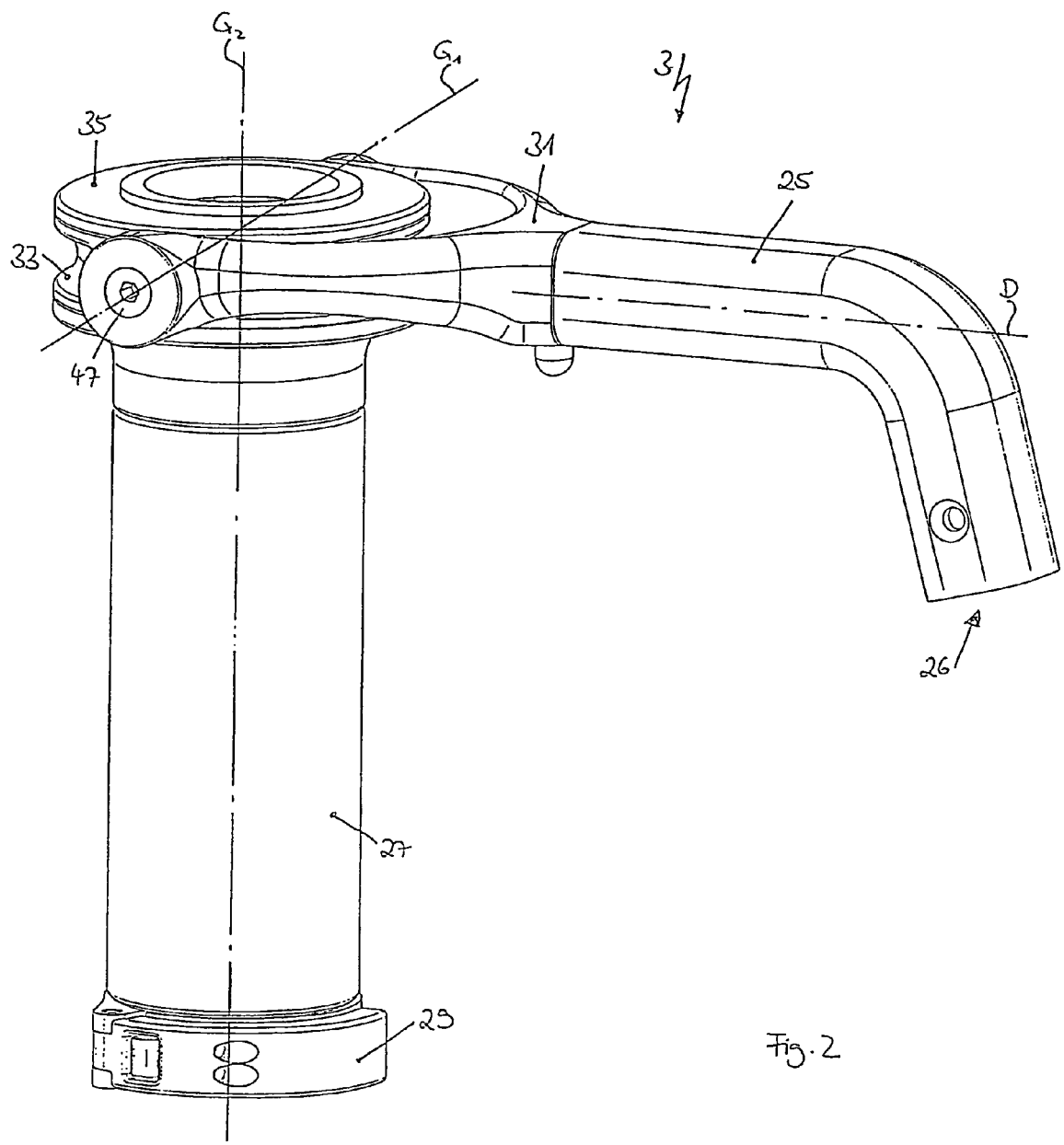

The construction comprising the pendulum tube 5, the camera holding device 7 and the holding device 15 for counterweights is now cardanically suspended in a suspension device 3 according to the invention. This suspension device 3 is shown in more detail in FIGS. 2 to 4 and comprises a first handle 25 as a joint input fixing element and a second handle 27 as a joint output fixing element. The first handle 25 is used to attach the suspension device to a support, in particular to a body support worn by a camera operator. For this, the joint input handle has a drill hole 26 by means of which it may be placed on a pivot on an upright stand or a spring arm in a waistcoat. The second handle 27 is used to attach the suspension device 3 to the camera balance device 1. For this, the second handle 27 has a tubular shape and is arranged around the pendulum tube 5 in the camera balance device 1 so that it may be moved relative to the pendulum tube 5. The second handle 27 is locked relative to the pendulum tube 5 by means of a clamp device 29.

By means of the two handles 25, 27, a camera operator can guide with both hands the construction fixed by means of the first handle 25 for example to a spring arm, a body support, an upright stand, dolly or crane.

Three axes of motion are realized in the joint connection between the first handle 25 and the second handle 27: the first handle 25 is connected to a fork element 31 in such a way that it may be rotated relative to this fork element 31 about an axis of rotation D corresponding to the longitudinal axis of a straight section of the first handle 25 extending horizontally in FIG. 1. The fork element 31 is in turn connected swivelably about a horizontal joint axis $G_1$ (first cardanic axis) to a joint outer ring 33. This joint outer ring 33 is in turn coupled rotatably about a vertical joint axis $G_2$ (second cardanic axis) to a joint inner ring 35, which in turn is in a fixed connection with the second handle 27, which is attached by the clamp device 29 to the pendulum tube 5 in the camera balance device 1. Hence, the first handle 25, which may be connected to the support, may be rotated in relation to the second handle 27 connected to the pendulum tube 5 about the axis of rotation D, swiveled about the horizontal joint axis $G_1$ and mounted rotatably about the vertical joint axis $G_2$.

The joint suspension device 3 is intended to prevent movements of the support, for example the body support, being transmitted to the camera attached to the holding plate 11. For this, the construction comprising the pendulum tube 5, camera holding device 7 and counterweights must be positioned on the holding device 15 with balance compensation. To achieve this balance compensation in particular also for different camera types with different weights and different locations of the center of gravity, the camera balance device 1 has a plurality of setting options. In particular, the system balance is achieved by the provision of counterweights of varying heaviness on the holding device 15. As already mentioned above, the backing plate 19 for counterweights is also mounted in a swivelable and movable way. The same may apply to the monitor holding device 17. The embodiment shown has as the holding device 15 for counterweights the monitor holder 17 and two backing plates 19, 19"; it is also obviously conceivable to provide other means of attachment for counterweights at different points of the pendulum tube 5.

As also mentioned above, in addition the adjusting screws 13 may be used to move the center of gravity of the camera (not shown) on the holding plate 11 relative to the base 9 connected to the pendulum tube 5. An even more flexible system may be obtained if the pendulum tube 5 is telescopic.

The slightest deviations in the centering of cardanic suspension device 3, or to be more precise of the joint inner ring 35, relative to the pendulum tube 5 exert a significant influence on the balance set by means of the counterweights. Deviations in the centering of this kind can, for example, be caused by tolerance deviations in the external diameter of the pendulum tube 5 and result in substantial errors in the camera guidance, in particular when this is performed at high speeds.

Figure 3:
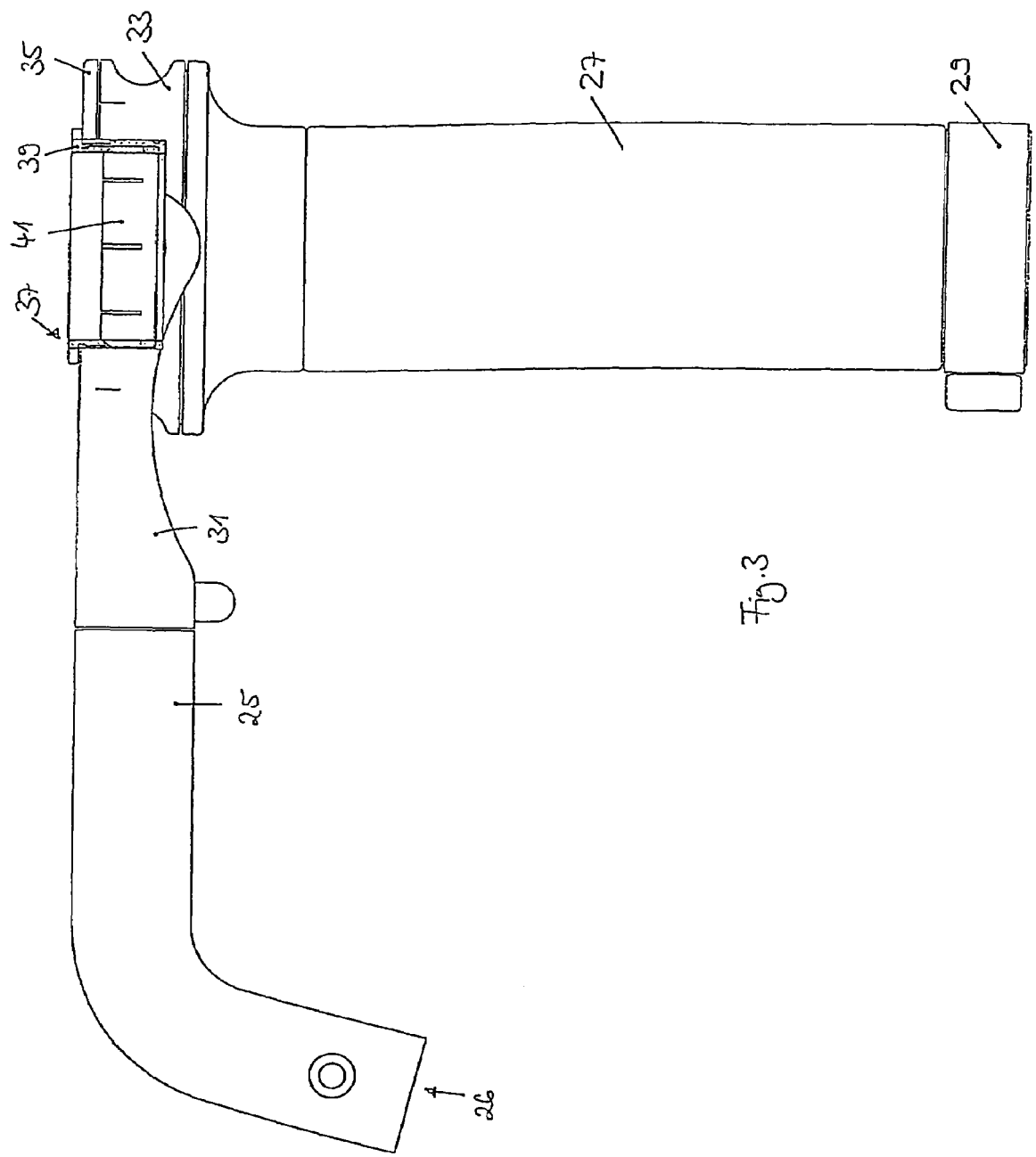

For this reason, the suspension device according to the invention has on one side a centering device 37 with which the relative position between the second handle 27 and the pendulum tube 5 may be established without slip. FIG. 3 elucidates this centering device 37, which is provided in the area of the two intersecting joint axes $G_1$ and $G_2$. The centering device 37 and the clamp device 29, which is used to fix the second handle 27 to the pendulum tube 5, are therefore located at opposite ends of the second handle 27. The distance between this clamp device 29 and the centering device 37 prevents the clamping of the clamp device 29 from having a detrimental impact on the centering device 37, i.e. from causing the decentralization of the suspension device 3 relative to the two joint axes $G_1$ and $G_2$ and the axis of rotation D.

The centering device 37 according to the invention has an adjusting ring 39 provided with a thread which is screwed into the joint inner ring 35. In this embodiment, the centering device 37 is steplessly adjustable due to the thread. This adjusting ring 39 has in its interior a cone which presses on a counter-cone in a slotted clamping ring 41 made of plastic, which is provided on the pendulum tube 5. The centering of the two elements is therefore achieved by the interaction of the cone of the adjusting ring 39 with the cone of the clamping ring 41. The adjusting ring 39 is preferably made of metal.

If the second handle 27 is pushed onto the pendulum tube 5 and said tube is in the desired position, the handles 27 are fixed at a long distance from the joint axes $G_1$, $G_2$ by the clamp device 29, and the centering is performed by the adjusting ring 39 and the clamping ring 41. This will prevent any slip, and in this position, reliable and good centering of suspension device 3 relative to the pendulum tube 5 is achieved. In addition, the suspension device 3 will also be fixed to the pendulum tube 5 at this point. However, the adjusting ring 39 and the clamping ring 41 are primarily used for the centering and only subordinately for fixing.

In addition, in the arrangement according to the invention, both the clamp device 29 and the centering device 27 are easy to access.

Figure 4:
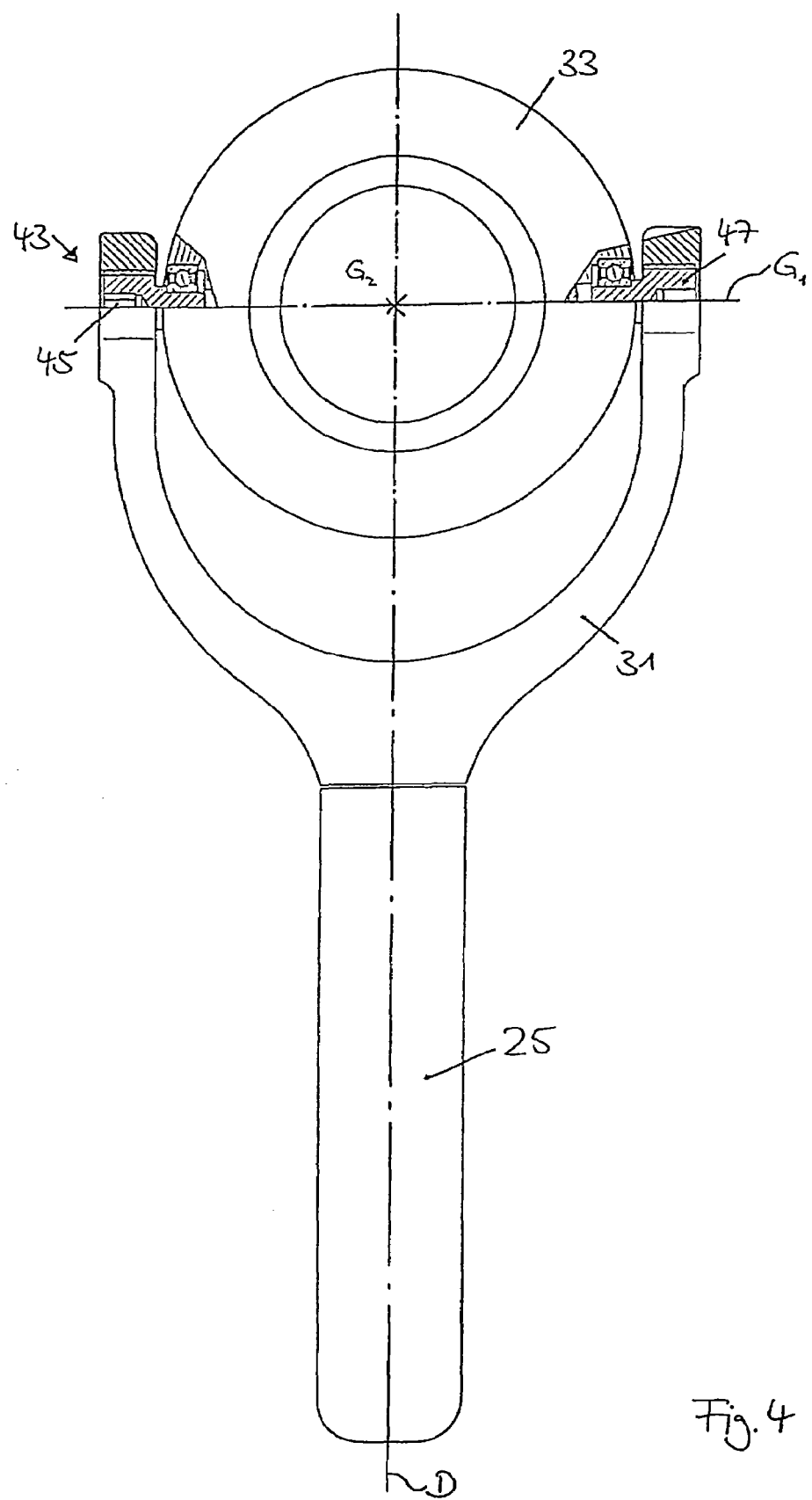

The suspension device according to the invention 3 also has another centering device 43, which will now be described with reference to FIG. 4. This other centering device 43 is used to move the vertical joint axis $G_2$ relative to axis of rotation D and in this way to center the pendulum tube 5 in the camera balance device 1 relative to the fork element 31 in the suspension device 3 according to the invention. In the embodiment shown, this centering device 43 is achieved by two adjusting screws 47, which are screwed into the fork element 31 by means of very fine threads and are also mounted swivelably relative to the joint outer ring 33. In this way, these adjusting screws provide the connection between the fork element 31 and the joint outer ring 33. The adjusting screws 47 have entry holes 45 for a tool. Turning the adjusting screws 47 achieves the centering of the fork element 31 relative to the pendulum tube 5 by moving the threaded outer ring 33 and hence the vertical joint axis $G_2$ along the horizontal joint axis $G_1$ relative to the fork element 31 and hence relative to the axis of rotation D. Here, the fine threads of the adjusting screws 47 permit adjustment in the range of hundredths of millimeters. In this way, the joint outer ring 33 and hence the pendulum tube 5 can be arranged exactly centrally relative to the fork element 31.

One of the two adjusting screws 47 can also be replaced by a spring-loaded thrust bearing.

The centering device 43 supplements the centering device 37 to achieve a further improvement to the alignment of the suspension device 3 according to the invention relative to the camera balance device 1.

The invention claimed is:

1. Cardanic suspension device (3) for a camera balance device (1), comprising
    two intersecting joint axes ($G_1$, $G_2$) with one of said axes ($G_2$) extending vertically (in a perpendicular manner) during operation and the other ($G_1$) extending horizontally and with an axis of rotation (D) extending through the vertical joint axis ($G_2$) and lying perpendicular to the horizontal joint axis ($G_1$),
    with a joint output fixing element (27) that may be rotated about the vertical joint axis ($G_2$) to fix the cardanic suspension device (3) to the camera balance device (1),
    with said joint output fixing element (27) in the form of a straight tube being formed so that it may be fixed to a tube (5) in the camera balance device and with a joint input fixing element (25) that can be rotated about the axis of rotation (D) to fix the cardanic suspension (3) to a support,
    whereby a centering device (37) is provided in the area of the vertical joint axis ($G_2$) and the horizontal joint axis ($G_1$) enables the relative position between the output fixing element (27) and the camera balance device (1) to be established without slip in said region,
    characterized in that
    the fixing of the output fixing element (27) to the camera balance device (1) is achieved by means of a clamping device (29) which is arranged in such a way that the clamp device (29) and the centering device (37) are located at a distance from each other, preferably at opposite ends, on the joint output fixing element (27); and
    the fixing of the output fixing element (27) to a tube (5) in the camera balance device (1) is achieved by means of said clamp device (29).

2. Cardanic suspension device (3) according to claim 1, characterized in that the joint input fixing element (25) is formed as a handle.

3. Cardanic suspension device (3) according to claim 1, characterized in that the joint output fixing element (27) is formed as a handle.

4. Cardanic suspension device (3) according to claim 1, characterized in that the centering device (37) is formed to be adjustable.

5. Cardanic suspension device (3) according to claim 4, characterized in that the centering device (37) is formed to be steplessly adjustable.

6. Cardanic suspension device (3) according to claim 1, characterized in that the tube has a circular cross section.

7. Cardanic suspension device (3) according to claim 1, characterized in that the centering device (37) is formed by an adjusting ring (39) which is provided with a clamping cone which in turn interacts with a clamping ring (41).

8. Cardanic suspension device (3) according to claim 1 characterized in that the centering device (37) is formed by an adjusting ring (39) which may be screwed into the end of the tube (27) and which is provided with a clamping cone which in turn interacts with a clamping ring (41) arranged on the camera balance device (1).

9. Cardanic suspension device (3) according to either claim 7 characterized in that the clamping ring (41) is made of plastic, metal, ceramic, a composite material or a combination of these materials.

10. Cardanic suspension device (3) according to claim 7, characterized in that the there is at least one slot in the clamping ring (41).

11. Cardanic suspension device (3) according to claim 7, characterized in that the adjusting ring (39) is made of metal, plastic, ceramic, a composite material or a combination of these materials.

12. Cardanic suspension device (3) according to claim 1, characterized in that the suspension device (3) is arranged movably on the camera balance device (1).

13. Cardanic suspension device (3) according to claim 1, characterized in that between the joint input (25) and the joint output fixing element (27) a second centering device (43) is provided with which the vertical joint axis ($G_2$) and the axis of rotation (D) are able to move in relation to each other.

14. Cardanic suspension device (3) according to claim 13, characterized in that the vertical joint axis ($G_2$) may be moved along the axial extension of the horizontal joint axis ($G_1$).

15. Cardanic suspension device (3) according to claim 13, characterized in that the movement of the vertical joint axis ($G_2$) is achieved by means of at least one adjusting screw (47).

16. Cardanic suspension device (3) according to claim 15, characterized in that the movement of the vertical joint axis ($G_2$) is achieved by means of two adjusting screws (47) whose longitudinal axes extend along the horizontal joint axis ($G_1$).

17. Cardanic suspension device (3) according to claim 2, characterized in that the joint output fixing element (27) is formed as a handle.

18. Cardanic suspension device (3) according to claim 8, characterized in that the clamping ring (41) is made of plastic, metal, ceramic, a composite material or a combination of these materials.

19. Cardanic suspension device (3) according to claim 14, characterized in that the movement of the vertical joint axis ($G_2$) is achieved by means of at least one adjusting screw (47).

20. Cardanic suspension device (3) according to claim 8, characterized in that between the joint input (25) and the joint output fixing element (27) a second centering device (43) is provided with which the vertical joint axis ($G_2$) and the axis of rotation (D) are able to move in relation to each other.

21. Cardanic suspension device (3) according to claim 1 where in the output fixing element (27) is attached to a fork element (31) so as to allow the fork element (31) to swivel about the horizontal joint axis ($G_1$).

* * * * *